US012586145B2

(12) United States Patent
Sohn et al.

(10) Patent No.: US 12,586,145 B2
(45) Date of Patent: Mar. 24, 2026

(54) METHOD AND APPARATUS FOR EDITING VIDEO IN ELECTRONIC DEVICE

(71) Applicant: SAMSUNG ELECTRONICS CO., LTD., Suwon-si (KR)

(72) Inventors: Jaesik Sohn, Suwon-si (KR); Jongim Kwack, Suwon-si (KR); Jeongheui Cho, Suwon-si (KR); Hyunsool Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 416 days.

(21) Appl. No.: 18/106,665

(22) Filed: Feb. 7, 2023

(65) Prior Publication Data

US 2023/0252598 A1 Aug. 10, 2023

Related U.S. Application Data

(63) Continuation of application No. PCT/KR2023/001670, filed on Feb. 6, 2023.

(30) Foreign Application Priority Data

Feb. 7, 2022 (KR) ......................... 10-2022-0015829

(51) Int. Cl.
*G06T 1/60* (2006.01)
*G06T 5/50* (2006.01)

(52) U.S. Cl.
CPC . *G06T 1/60* (2013.01); *G06T 5/50* (2013.01)

(58) Field of Classification Search
CPC ................ G06T 1/60; G06T 5/00; G06T 5/50
See application file for complete search history.

(56) References Cited

U.S. PATENT DOCUMENTS 8,732,121 B1 5/2014 Zorin et al.
11,990,155 B2 * 5/2024 Mizutani ................ G11B 27/36
(Continued)

FOREIGN PATENT DOCUMENTS

CN 104091607 10/2014
JP 2000253345 A * 9/2000
(Continued)

OTHER PUBLICATIONS

Search Report and Written Opinion dated May 3, 2023 issued in International Patent Application No. PCT/KR2023/001670.
(Continued)

*Primary Examiner* — Boris Gorney
*Assistant Examiner* — Robert F May
(74) *Attorney, Agent, or Firm* — NIXON & VANDERHYE P.C.

(57) ABSTRACT

According to various embodiments, an electronic device includes: a memory including a first area and a second area having different logical addresses and at least one processor connected to the memory. The at least one processor may be configured to: apply a hidden attribute to a second image generated by editing a first image stored in the first area; generate a temporary file for restoring the first image or the second image, based on at least some frames; locate the first image in the second area by changing a logical address of the first image; release the second image from the hidden attribute in response to identifying the first image as being located in the second area; and delete the temporary file in response to releasing the second image from the hidden attribute.

16 Claims, 8 Drawing Sheets

(56)  References Cited

U.S. PATENT DOCUMENTS

| | | | |
|---|---|---|---|
| 2004/0141723 | A1 | 7/2004 | Sakano |
| 2006/0098950 | A1* | 5/2006 | Naruse ................. H04N 9/8042 |
| | | | 386/241 |
| 2007/0299888 | A1* | 12/2007 | Thornton ............... G06F 16/51 |
| | | | 707/999.203 |
| 2008/0143742 | A1 | 6/2008 | Jeong et al. |
| 2009/0013036 | A1 | 1/2009 | Kim et al. |
| 2009/0086030 | A1 | 4/2009 | Takamiya |
| 2011/0060774 | A1 | 3/2011 | Shintani |
| 2012/0050574 | A1* | 3/2012 | Choi .................... G11B 27/329 |
| | | | 348/E5.031 |
| 2015/0109464 | A1* | 4/2015 | Seo ....................... G06F 16/174 |
| | | | 348/207.1 |
| 2016/0203841 | A1 | 7/2016 | Cho et al. |
| 2019/0079955 | A1 | 3/2019 | Kato |
| 2021/0050574 | A1 | 2/2021 | Katayama et al. |

FOREIGN PATENT DOCUMENTS

| | | |
|---|---|---|
| KR | 20080056583 A | 6/2008 |
| KR | 10-2009-0004231 | 1/2009 |
| KR | 10-2016-0057506 | 5/2016 |
| KR | 10-2016-0087573 | 7/2016 |
| KR | 10-1762676 | 8/2017 |
| KR | 10-2019-0123993 | 11/2019 |

OTHER PUBLICATIONS

Extended European Search Report dated Jan. 28, 2025 issued in European Patent Application No. 23750003.8.

* cited by examiner

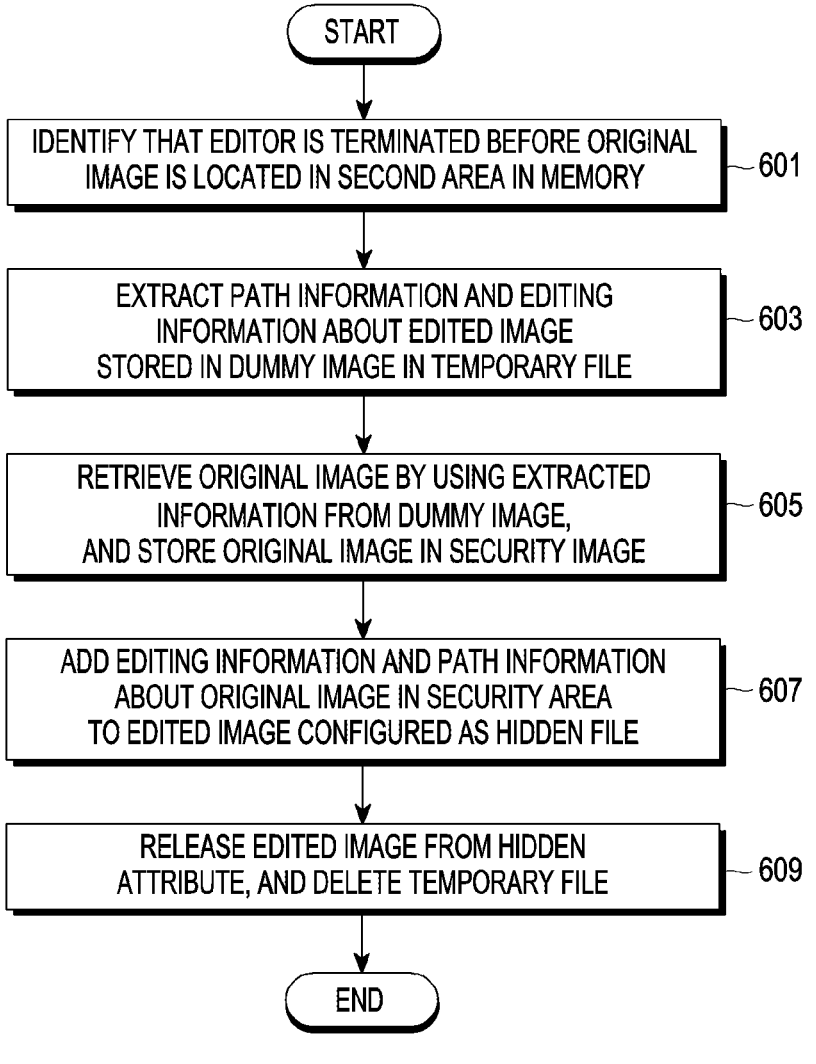

START

IDENTIFY THAT EDITOR IS TERMINATED BEFORE ORIGINAL
IMAGE IS LOCATED IN SECOND AREA IN MEMORY — 601

EXTRACT PATH INFORMATION AND EDITING
INFORMATION ABOUT EDITED IMAGE
STORED IN DUMMY IMAGE IN TEMPORARY FILE — 603

RETRIEVE ORIGINAL IMAGE BY USING EXTRACTED
INFORMATION FROM DUMMY IMAGE,
AND STORE ORIGINAL IMAGE IN SECURITY IMAGE — 605

ADD EDITING INFORMATION AND PATH INFORMATION
ABOUT ORIGINAL IMAGE IN SECURITY AREA
TO EDITED IMAGE CONFIGURED AS HIDDEN FILE — 607

RELEASE EDITED IMAGE FROM HIDDEN
ATTRIBUTE, AND DELETE TEMPORARY FILE — 609

END

FIG. 6

METHOD AND APPARATUS FOR EDITING VIDEO IN ELECTRONIC DEVICE

CROSS-REFERENCE TO RELATED APPLICATIONS

This application is a continuation of International Application No. PCT/KR2023/001670 designating the United States, filed on Feb. 6, 2023, in the Korean Intellectual Property Receiving Office and claiming priority to Korean Patent Application No. 10-2022-0015829, filed on Feb. 7, 2022, in the Korean Intellectual Property Office, the disclosures of which are incorporated by reference herein in their entireties.

BACKGROUND

Field

The disclosure relates to an electronic device and a method for editing and restoring an image at least temporarily stored in a memory in an electronic device.

Description of Related Art

Electronic devices (e.g., a mobile communication terminal, a smartphone, a tablet personal computer (PC), a notebook computer, and/or a digital camera) have been variously used in recent years. The frequency of users editing an image (e.g., a still image and a video) in daily life using an electronic device is also increasing.

For example, a user may capture an image via a camera provided in an electronic device in daily life regardless of space and/or time. In addition, the user may receive an image through wireless communication and/or wired communication. After capturing or receiving an image, the user may edit the image in various ways via the electronic device.

The user may edit the image using various editing tools (e.g., image filter, color tone curve, contrast, brightness, sharpness, crop, and/or rotation changes) included in an application installed in the electronic device.

When an unexpected error occurs in an application and thus the application is abnormally terminated during image editing in an electronic device, the original image or an edited image may be damaged.

SUMMARY

Embodiments of the disclosure may provide an electronic device capable of restoring an original image or an edited image even when an application is abnormally terminated during image editing, and a method for editing and restoring an image stored in a memory in an electronic device.

According to various embodiments, an electronic device may include: a memory in which a first area and a second area having different logical addresses are configured, and at least one processor connected to the memory. The at least one processor may be configured to apply a hidden attribute to a second image generated by editing a first image stored in the first area; generate a temporary file for restoring the first image or the second image based on at least some frames; locate the first image in the second area by changing a logical address of the first image; release the second image from the hidden attribute in response to identifying the first image as being located in the second area; and delete the temporary file in response to releasing the second image from the hidden attribute.

According to various embodiments, a method of operating an electronic device may include: applying a hidden attribute to a second image generated by editing a first image stored in a first area having a first logical address in a memory, generating a temporary file for restoring the first image or the second image, based on at least some frames, locating the first image in a second area having a second logical address in the memory by changing a logical address of the first image, releasing the second image from the hidden attribute in response to identifying the first image as being located in the second area, and deleting the temporary file in response to releasing the second image from the hidden attribute.

According to various embodiments, an electronic device may restore an edited image or an original image when the edited image is not normally exposed to a user.

According to various embodiments, an electronic device may restore an edited image or an original image when an application is abnormally terminated during image editing.

BRIEF DESCRIPTION OF THE DRAWINGS

FIG. 6 illustrates an example of an operation of an electronic device generating and deleting a temporary file according to various embodiments;

DETAILED DESCRIPTION

Figure 1:
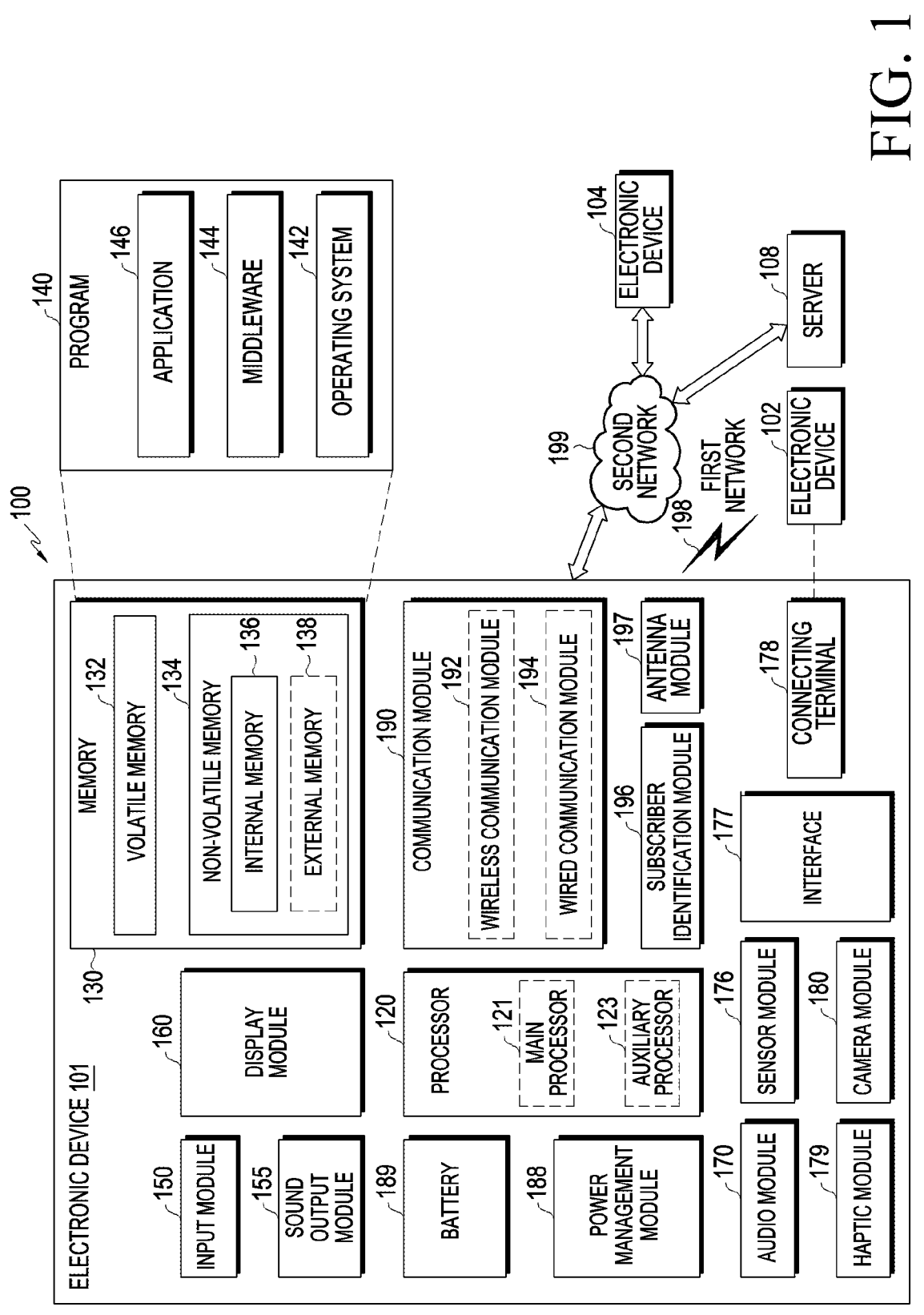
FIG. 1 is a block diagram of an electronic device in a network environment according to various embodiments.

FIG. 1 is a block diagram illustrating an electronic device in a network environment according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
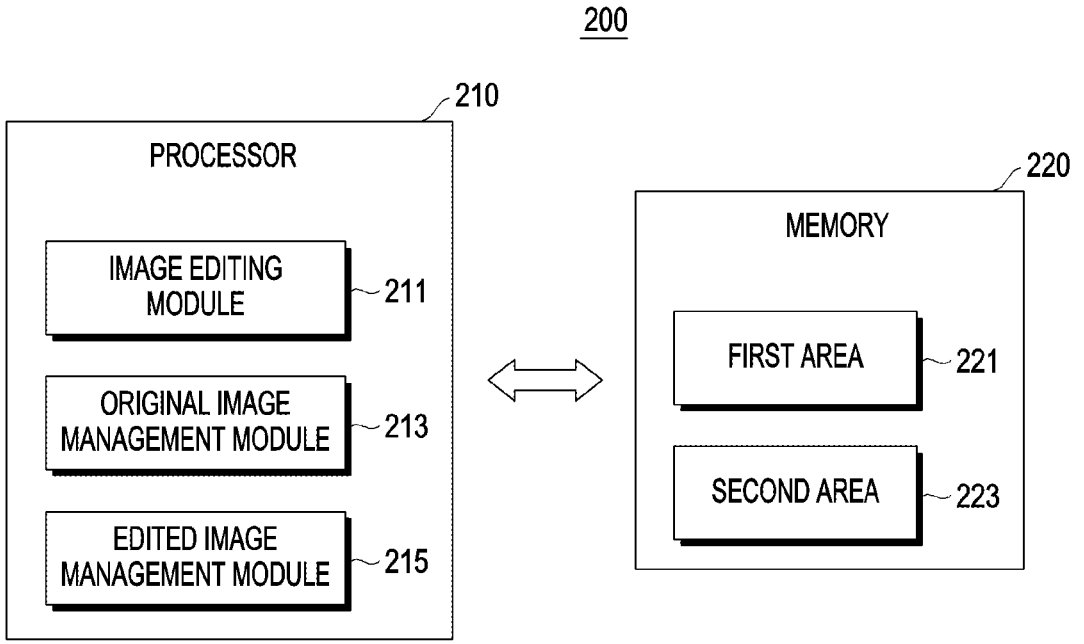
FIG. 2 illustrates an example of a block diagram of an electronic device according to various embodiments.

FIG. 2 illustrates an example of a block diagram of an electronic device according to various embodiments.

Referring to FIG. 2, the electronic device 200 (e.g., the electronic device 101 of FIG. 1) may include a processor (e.g., including processing circuitry) 210 and a memory 220. According to various embodiments, the processor 210 may be the same as or similar to the processor 120 of FIG. 1. According to various embodiments, the processor 210 may include an image editing module 211, an original image management module 213, and an edited image management module 215. For example, the image editing module 211, the original image management module 213, and the edited image management module 215 may be software modules, and may be executed in the processor 210. For example, operations of the image editing module 211, the original image management module 213, and the edited image management module 215 may be understood as operations of the processor 210, and the modules may include various processing circuitry and/or executable program instructions.

According to various embodiments, the memory 220 may be the same as or similar to the memory 130 of FIG. 1. According to various embodiments, the memory 220 may include a first area 221 and a second area 223. For example, the first area 221 and the second area 223 may be physically separated areas, and may be configured to be physically separated in one memory or may be configured in separate memories. The first area 221 and the second area 223 may be logically separated areas within the same physical memory 220. According to various embodiments, the first area 221 and the second area 223 may be areas to which different logical addresses are respectively allocated within the memory 220. According to various embodiments, the first area 221 may be referred to as a general area or a shared area, and the second area 223 may be referred to as a security area.

According to various embodiments, the image editing module 211 may edit an image at least temporarily stored in the memory 220. The original image management module 213 may manage an original image before editing which is at least temporarily stored in the memory 220. The edited image management module 215 may manage an edited image edited by the image editing module 211.

According to various embodiments, the first area 221 may be an area configured to be accessible by a user within the memory 220, and the second area 223 may be an area set to be inaccessible by the user within the memory 220. According to various embodiments, as described above, the first area 221 and the second area 223 may be physically separated areas, or may be logically separated areas within the same memory 220. According to various embodiments, the first area 221 and the second area 223 may exist in the same memory 220, but may be allocated different addresses (or logical addresses).

Although FIG. 2 shows that the first area 221 and the second area 223 exist in the same memory 220, the technical idea of the disclosure is not limited thereto, and the first area 221 and the second area 223 may be configured in different memories.

According to various embodiments, the image editing module 211 may generate a separate project file for image editing when editing an image, and may edit the image using the project file. According to various embodiments, when the image editing module 211 edits the image using the project file, the project file and/or an original image file may be deleted, or a file path may be changed. According to various embodiments, when an edited image and the original image exist at the same time when the image editing module 211 edits the image using the project file, it may be difficult to retrieve and manage a file.

According to various embodiments, the image editing module 211 may use a nondestructive editing method instead of an image editing method using a project file. According to various embodiments, the image editing module 211 may perform a nondestructive editing method including at least some of the following operations 1a to 4a.

1a. Saving editing-related information when editing and then saving image;

2a. Saving an edited image;

3a. Saving editing-related information in saved edited video;

4a. Moving the original image to second area in memory

According to various embodiments, when the image editing module 211 uses the nondestructive editing method, it may be not be possible to retain an edited image and an original image with the same name and/or the same media ID in the same folder. According to various embodiments, to retain the same name and/or the same media ID in the same folder with respect to an image being edited, the edited image management module 215 may apply a hidden attribute to the edited image to store the edited image as a hidden file in the first area 221. According to various embodiments, the edited image management module 215 may store the edited image as the hidden file so that a multimedia file management program (e.g., a gallery application) may not recognize the edited file. According to various embodiments, the location of the hidden file in which the edited image is stored may be the same as the location of a folder of the original image.

According to various embodiments, the original image management module 213 may manage the original image stored in the first area 221 to be stored in the second area 223 by changing an address value of the original image. According to various embodiments, the original image management module 213 may change the address value of the original image, based on a move instruction. According to various embodiments, the original image management module 213 may store the original image in the second area 223 using a low-level file system not recognizable by the multimedia file management program (e.g., the gallery application).

According to various embodiments, the edited image management module 215 may release the edited image to which the hidden attribute has been applied from the hidden attribute to expose the edited image with the same name in the location where the original image has been. According to various embodiments, based on identifying that the original image is successfully stored in the second area 223, the edited image management module 215 may expose the edited image to which the hidden attribute has been applied in the location where the original image has been, thus enabling a user to recognize the edited image as the original image.

According to various embodiments, when an editor (e.g., an image editing application) is suddenly terminated while the original image stored in the first area 221 is stored in the second area 223, the file management program may recognize the original image as being deleted. According to various embodiments, when the editor (e.g., the image editing application) is suddenly terminated while the edited image management module 215 releases the edited image to which the hidden attribute has been applied from the hidden attribute, the file management program may recognize the image as not being updated to the edited image.

Figure 3:
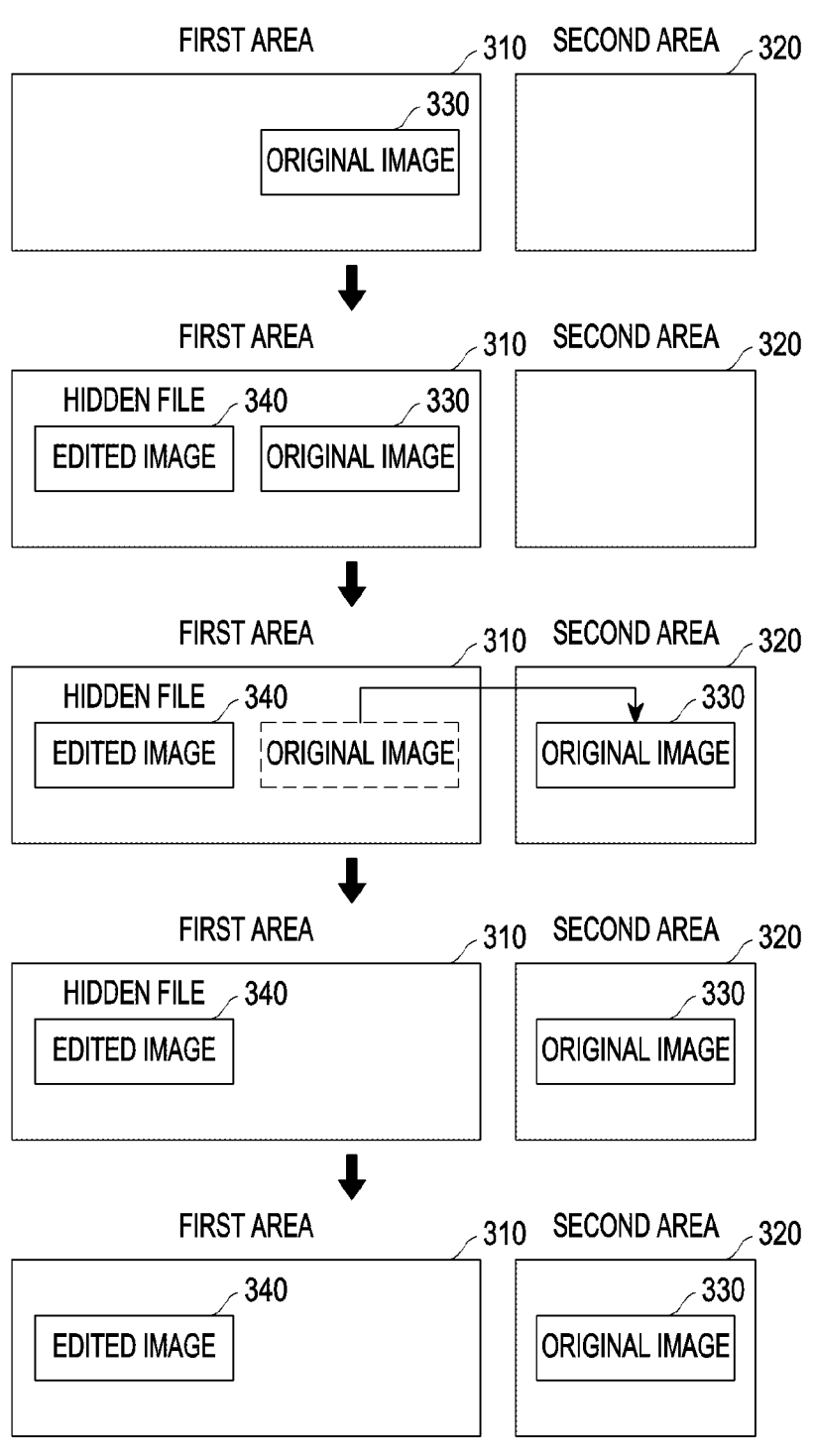
FIG. 3 illustrates an example illustrating an operation of an electronic device editing an image according to various embodiments.

FIG. 3 illustrates an example illustrating an operation of an electronic device editing an image according to various embodiments.

Referring to FIG. 3, a processor (e.g., the processor 120 of FIG. 1 or the processor 210 of FIG. 2) included in the electronic device (e.g., the electronic device 101 of FIG. 1 or the electronic device 200 of FIG. 2) may generate an edited image 340 by editing an original image 330 stored in a first area 310 (e.g., the first area 221 of FIG. 2) in a memory. According to various embodiments, the processor may apply a hidden attribute to the edited image 340 in the first area 310, thereby configuring the edited image 340 as a hidden file.

According to various embodiments, the processor may change an address (or logical address) of the original image 330 stored in the first area 310, thereby controlling the original image 330 to be located in a second area 320 (e.g., the second area 223 of FIG. 2). According to various embodiments, after successfully locating the original image 330 in the second area 320, the processor may release the edited image 340 from the hidden attribute to expose the edited image 340 in the first area 310 to a user.

Figure 4:
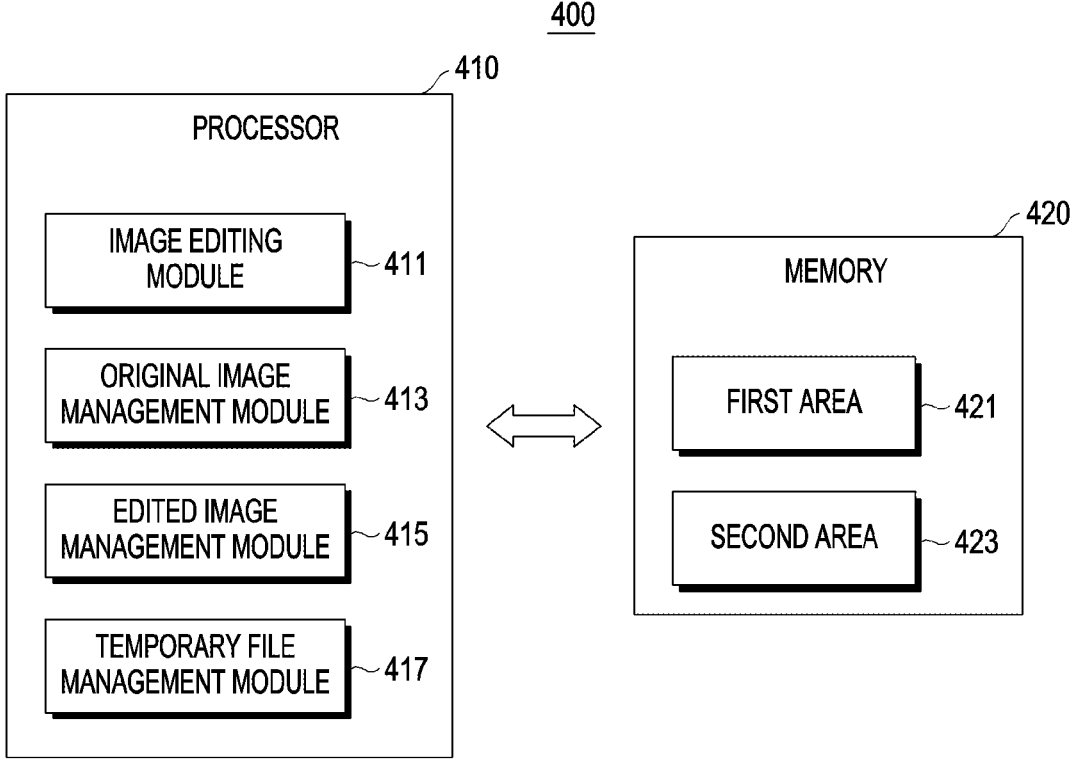
FIG. 4 illustrates another example of a block diagram of an electronic device according to various embodiments.

FIG. 4 illustrates another example of a block diagram of an electronic device according to various embodiments.

Referring to FIG. 4, the electronic device 400 may include a processor (e.g., including processing circuitry) 410 and a memory 420. According to various embodiments, the processor 410 may be the same as or similar to the processor 120 of FIG. 1. According to various embodiments, the processor 410 may include an image editing module 411, an original image management module 413, an edited image management module 415, and a temporary file management module 417. For example, the image editing module 411, the original image management module 413, the edited image management module 415, and the temporary file management module 417 may be software modules, and may be executed in the processor 410. For example, operations of the image editing module 411, the original image management module 413, the edited image management module 415, and the temporary file management module 417 may be understood as operations of the processor 410.

According to various embodiments, the memory 420 may be the same as or similar to the memory 130 of FIG. 1. According to various embodiments, the memory 420 may include a first area 421 and a second area 423. According to various embodiments, the first area 421 and the second area 423 may be areas to which different logical addresses are respectively allocated within the memory 420. According to various embodiments, the first area 421 may be referred to as a general area or a shared area, and the second area 423 may be referred to as a security area.

According to various embodiments, the image editing module 411 may edit an image stored in the memory 420, the original image management module 413 may manage an original image before editing stored in the memory 420, and the edited image management module 415 may manage an edited image resulting from editing by the image editing module 411. According to various embodiments, the temporary file management module 417 may generate and manage a temporary file for restoring an original image and/or an edited image in a situation in which an editor (e.g., an image editing application) is abnormally terminated.

According to various embodiments, the first area 421 may be an area configured to be accessible by a user within the memory 420, and the second area 423 may be an area set to be inaccessible by the user within the memory 420. According to various embodiments, the first area 421 and the second area 423 may be areas existing in the same memory 420 and logically separated. According to various embodiments, the first area 421 and the second area 423 may exist in the same memory 420, but may be allocated different addresses (or logical addresses).

Although FIG. 4 shows that the first area 421 and the second area 423 exist in the same memory 420, the technical idea of the disclosure is not limited thereto, and the first area 421 and the second area 423 may be configured in different memories.

According to various embodiments, the image editing module 411 may store editing-related information when storing an image after editing. According to various embodiments, the edited image management module 415 may apply a hidden attribute to an edited image to store the edited image as a hidden file in the first area 421 so that a multimedia file management program (e.g., a gallery application) may not recognize the edited image. According to various embodiments, the location of the hidden file in which the edited image is stored may be the same as the location of a folder of an original file.

According to various embodiments, the temporary file management module 417 may generate a temporary file including at least one of a dummy image and metadata. According to various embodiments, the dummy image may be a video generated based on a predetermined image. According to various embodiments, the dummy image may be generated using some frames of an edited image and/or an original image. According to various embodiments, the temporary file management module 417 may generate the temporary file by adding at least one of path information about the original image in the first area 421, path information about the edited image to which the hidden attribute is applied, path information about the original image in the second area 423, and editing information used for the edited image as the metadata.

According to various embodiments, the dummy image may be used in various applications. According to various embodiments, an editor (e.g., an image editing application) may restore the original image and/or the edited image using the dummy image. According to various embodiments, the multimedia file management program (e.g., the gallery application) may perform a process of restoring the original image and/or the edited image using the dummy image. According to various embodiments, the dummy image may be a video file for image restoration, and may further include identification information for distinguishing from a general video file.

For example, the path information about the original image may be configured as follows.

path:/X1/DCIM/Camera/AA.mp4

For example, the path information about the edited image may be configured as follows.

path:/X2/DCIM/Camera/BB.mp4

According to various embodiments, "X1" included in the path information about the original image and "X2" included in the path information about the edited image may indicate different paths.

According to various embodiments, the metadata may include at least one of version information, original image information (e.g., resolution and duration), section editing information (e.g., trim duration), filter information (e.g., a filter type and a filter name), and brightness adjustment information (e.g., brightness). According to various embodiments, a temporary file may be configured by adding text-type metadata information to the dummy image.

According to various embodiments, the dummy image generated by the temporary file management module 417 may be displayed through the multimedia file management program (e.g., the gallery application). According to various embodiments, the user may identify the dummy image displayed through the multimedia file management program (e.g., the gallery application), and may recognize that there is an image being edited. According to various embodiments, in a situation in which the editor (e.g., the image editing application) is abnormally terminated, the user may select the dummy image displayed through the multimedia file management program (e.g., the gallery application) to conduct an image editing process again.

According to various embodiments, the edited image management module 415 may store at least one of the editing information, the path information about the original image in the second area 423, and the path information about the original image in the first area 421 in the edited image to which the hidden attribute is applied.

According to various embodiments, the original image management module 413 may manage the original image stored in the first area 421 to be stored in the second area 423 by changing an address value of the original image. According to various embodiments, the original image management module 413 may change the address value of the original image, based on a move instruction. According to various embodiments, the original image management module 413 may store the original image in the second area 423 using a low-level file system not recognizable by the multimedia file management program (e.g., the gallery application).

According to various embodiments, the edited image management module 415 may release the edited image to which the hidden attribute has been applied from the hidden attribute to expose the edited image with the same name in the location where the original image has been. According to various embodiments, based on identifying that the original image is successfully stored in the second area 423, the edited image management module 415 may expose the edited image to which the hidden attribute has been applied in the location where the original image has been, thus enabling a user to recognize the edited image as the original image.

According to various embodiments, when the edited image is completely released from the hidden attribute, the temporary file management module 417 may delete the temporary file including the at least one of the dummy image and the metadata.

Figure 5:
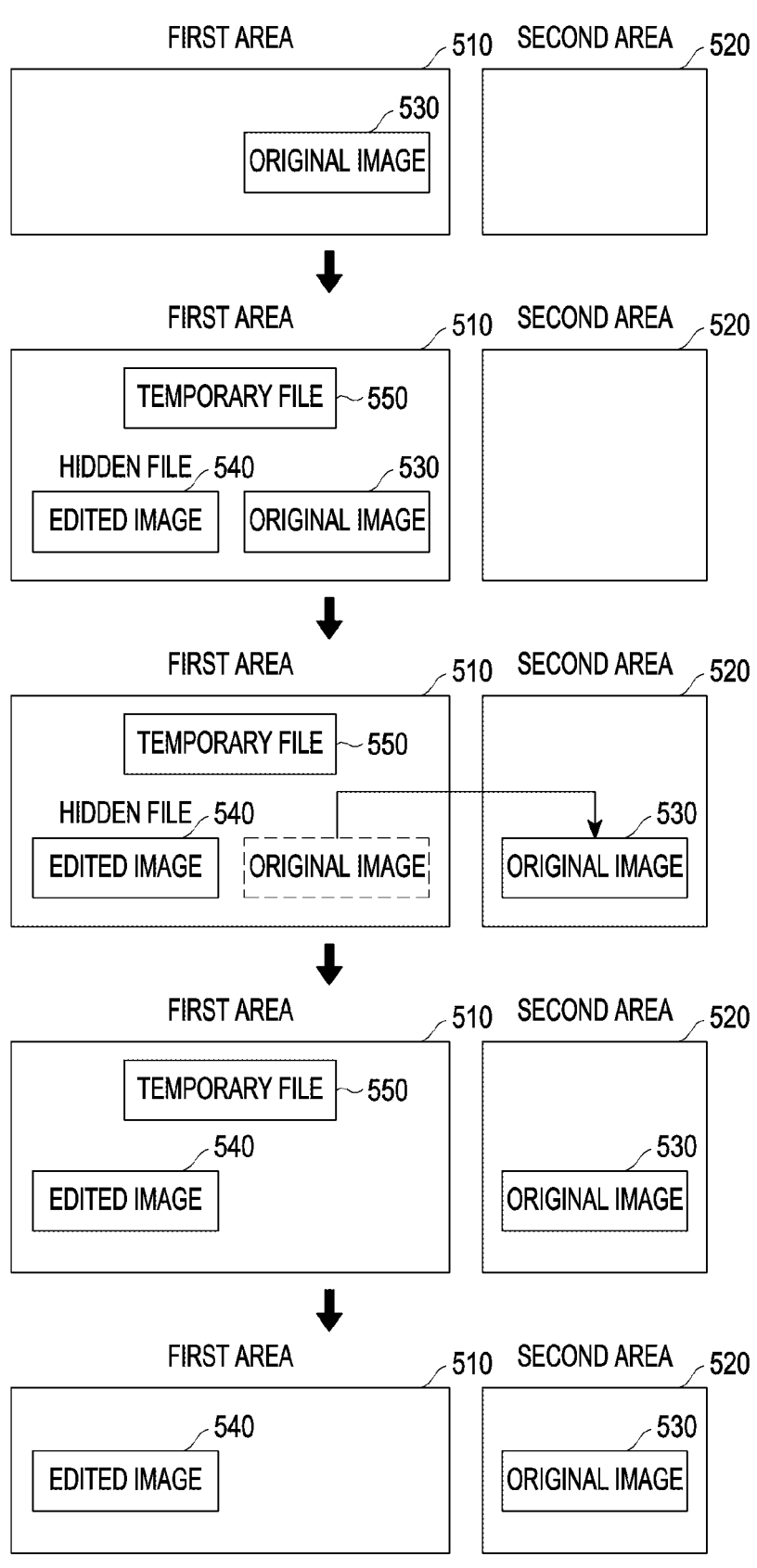
FIG. 5 illustrates an example illustrating an operation of an electronic device editing an image according to various embodiments.

FIG. 5 illustrates an example illustrating an operation of an electronic device editing an image according to various embodiments.

Referring to FIG. 5, a processor (e.g., the processor 120 of FIG. 1 or the processor 410 of FIG. 4) included in the electronic device (e.g., the electronic device 101 of FIG. 1 or the electronic device 400 of FIG. 4) may generate an edited image 540 by editing an original image 530 stored in a first area 510 (e.g., the first area 421 of FIG. 4) in a memory. According to various embodiments, the processor may apply a hidden attribute to the edited image 540 in the first area 510, thereby configuring the edited image 540 as a hidden file.

According to various embodiments, the processor may generate, in the first area 510, a temporary file 550 used to restore the original image 530 and/or the edited image 540 in case an editor (e.g., an image editing application) is suddenly terminated. According to various embodiments, the temporary file 550 may include at least one of a dummy image and metadata.

According to various embodiments, the dummy image may be a video generated based on at least some frames of a predetermined image. According to various embodiments, the dummy image may be generated using at least some frames of the edited image 540 and/or the original image 530. According to various embodiments, the dummy image may be generated based on a different frame irrelevant to the original image 530 and/or the edited image 540. According to various embodiments, the dummy image may be generated (or edited) based on a sample image belonging to a resource of the image editing program and/or a pre-designated file (or frame) completely irrelevant to the original.

According to various embodiments, the metadata may include at least one of path information about the original image 530 in the first area 510, path information about the edited image 540 configured to be hidden, path information about the original image 530 in a second region 520, and editing information used in image editing.

According to various embodiments, the processor may change an address (or logical address) of the original image 530 stored in the first area 510, thereby controlling the original image 530 to be located in the second area 520 (e.g., the second area 223 of FIG. 2). According to various embodiments, after successfully locating the original image 530 in the second area 520, the processor may release the edited image 540 from a hidden attribute to expose the edited image 540 in the first area 510. According to various embodiments, when hiding of the edited image 540 is completely released, the processor may delete the temporary file 550.

FIG. 6 illustrates an example of an operation of an electronic device generating and deleting a temporary file according to various embodiments.

Referring to FIG. 6, in operation 601, an electronic device (e.g., the electronic device 101 of FIG. 1, the electronic device 400 of FIG. 4, the processor 210 of FIG. 2, or the processor 410 of FIG. 4) may identify that an editor (e.g., an image editing application) is terminated before an original image is located in a second area (e.g., the second area 423 of FIG. 4) in a memory. According to various embodiments, when the editor (e.g., the image editing application) is terminated before the original image is located in the second area in the memory, the original image may remain as it is in a first area (e.g., the first area 421 of FIG. 4), and an edited image may be subjected to a hidden attribute to remain as a hidden file.

In operation 603, the electronic device may extract (or identify) at least one of path information and editing information about the edited image added to a dummy image included in a temporary file.

In operation 605, the electronic device may retrieve the original image using the extracted (or identified) at least one of the path information and the editing information about the edited image, and may change an address value of the original image to store the original image in the second area.

In operation 607, the electronic device may add the editing information and path information about the original in the second area to the edited image configured as the hidden file.

In operation 609, the electronic device may release the edited image from the hidden attribute to expose the edited image to a location where the original image has been in the first area, and may delete the temporary file.

When the electronic device fails to retrieve the original image using the extracted at least one of the path information and the editing information about the edited image or the original image does not exist in operation 605, the electronic device may release the edited image from the hidden attribute to expose the edited image to the location where the original image has been in the first area. According to various embodiments, when the original image does not exist, path information about the original image and the editing information may not be added to the edited image.

Figure 7:
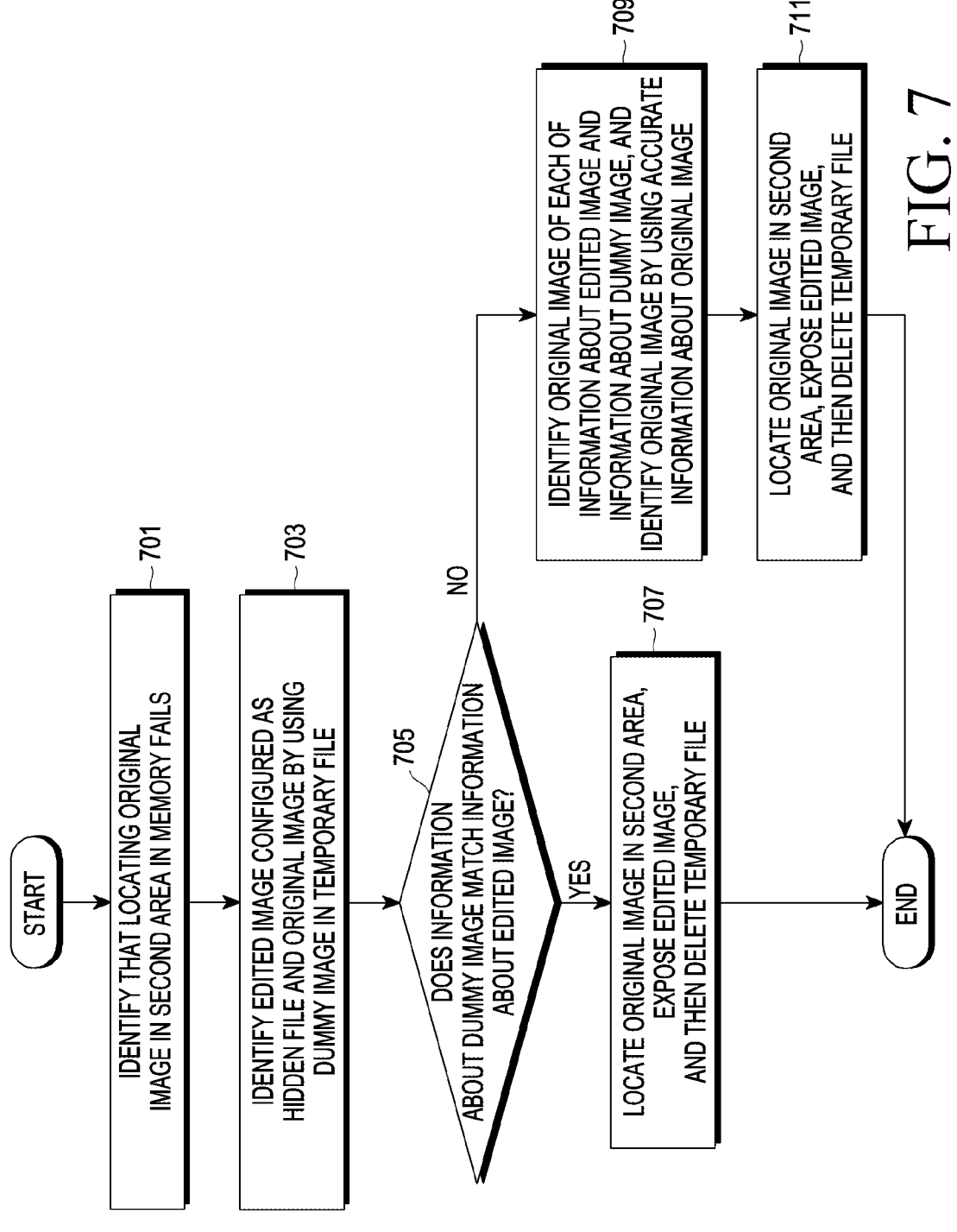
FIG. 7 illustrates another example of an operation of an electronic device generating and deleting a temporary file according to various embodiments.

FIG. 7 illustrates another example of an operation of an electronic device generating and deleting a temporary file according to various embodiments.

Referring to FIG. 7, in operation 701, the electronic device (e.g., the electronic device 101 of FIG. 1, the electronic device 400 of FIG. 4, the processor 210 of FIG. 2, or the processor 410 of FIG. 4) may identify that locating an original image in a second area (e.g., the second area 423 of FIG. 4) in a memory fails. According to various embodiments, when the original image is not located in the second area in the memory, the original image, a temporary file, and an edited image configured as a hidden file may exist in the first area. According to various embodiments, the edited image configured as the hidden file may include path information about the original image in the second area and editing information.

In operation 703, the electronic device may identify the edited image configured as the hidden file and the original image using a dummy image in the temporary file.

In operation 705, the electronic device may extract information added to the edited image configured as the hidden file, thereby determining whether information about the dummy image matches information about the edited image.

When the information about the dummy image and the information about the edited image match in operation 705 (705—Yes), the electronic device may change an address (or logical address) of the original image to locate the original image in the second area, may release the edited image from a hidden attribute to expose the edited image in the first area, and may then delete the temporary file in operation 707.

When the information about the dummy image and the information about the edited image do not match in operation 705 (705—No), the electronic device may identify the original image of each of the information about the edited image and the information about the dummy image, and may identify the original image, based on more accurate information about the original image among the two pieces of information in operation 709.

In operation 711, the electronic device may change the address (or logical address) of the original image to locate the original image in the second area, may release the edited image from the hidden attribute to expose the edited image in the first area, and may then delete the temporary file. According to various embodiments, the electronic device may change the address (or logical address) of the original image to locate the original image in the second area, and may update information included in the edited image when the edited image needs updating.

Figure 8:
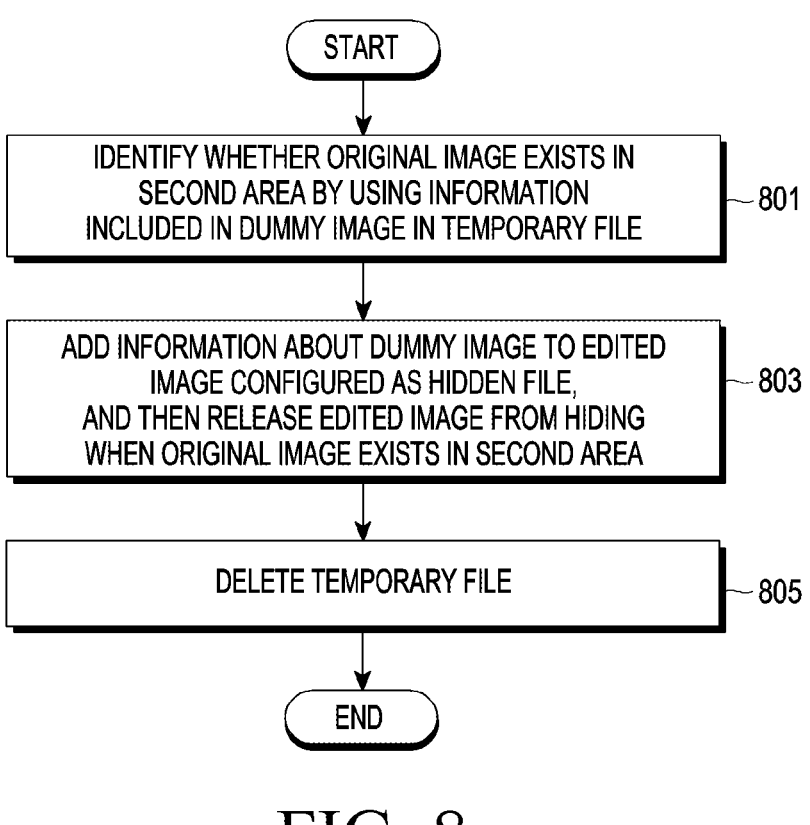
FIG. 8 illustrates still another example of an operation of an electronic device generating and deleting a temporary file according to various embodiments.

FIG. 8 illustrates still another example of an operation of an electronic device generating and deleting a temporary file according to various embodiments.

Referring to FIG. 8, in operation 801, the electronic device (e.g., the electronic device 101 of FIG. 1 or the electronic device 400 of FIG. 4) may identify whether an original image exists in a second area (e.g., the second area 423 of FIG. 4) using information added to a dummy image in a temporary file.

When the original image is determined to exist in the second area in operation 801, the electronic device may add information about the dummy image to an edited image configured as a hidden file, and may release the edited image from an hidden attribute in operation 803.

In operation 805, the electronic device may delete the temporary file. According to various embodiments, when the original image is completely stored in the second area, only the temporary file may be seen by a user, and the edited image processed as the hidden file and the original image in the second area may not be displayed to the user.

According to various embodiments, when an editor (e.g., an image editing application) is abnormally terminated while releasing the hidden attribute of the edited image, the only the temporary file may be seen by a user, and the edited image processed as the hidden file and the original image in the second area may not be displayed to the user. According to various embodiments, the electronic device may identify that the original image exists in the second area using the information added to the dummy image in the temporary file, may add the information about the dummy image to the edited image configured as the hidden file, and may then release the edited image from the hidden attribute.

According to various embodiments, when the original image does not exist, the electronic device may restore only the edited image to which the hidden attribute is applied. According to various embodiments, when the edited image to which the hidden attribute is applied does not exist, the electronic device may identify existence of the original image in the security area, and may expose the original image in the second area at a location where the original image has previously existed or may generate an edited image again using the original image and editing information about the temporary file. According to various embodiments, the electronic device may add location information about the original image in the second area and editing information to the image generated again.

According to various embodiments, when restoring the original image existing in the second area, the electronic device may copy the original image existing in the second area to expose the original image in the previous location of the original image in the first area, or may change an address value of the original image using a low-level file system to expose the original image in the first area.

According to various embodiments, an electronic device (e.g., the electronic device 101 of FIG. 1 or the electronic device 400 of FIG. 4) may include: a memory (e.g., the memory 130 of FIG. 1 or the memory 420 of FIG. 4) configured to include a first area (e.g., the first area 421 of FIG. 4) and a second area (e.g., the second area 423 of FIG. 4) having different logical addresses, and at least one processor (e.g., the processor 120 of FIG. 1 or the processor 410 of FIG. 4) connected to the memory.

According to various embodiments, the at least one processor may be configured to: apply a hidden attribute to a second image generated by editing a first image stored in the first area; and generate a temporary file for restoring the first image or the second image in the first area, based on at least some frames.

According to various embodiments, the at least one processor may be configured to locate the first image in the second area by changing an address (or logical address) of the first image.

According to various embodiments, the at least one processor may be configured to: release the second image from the hidden attribute in response to identifying the first image as being located in the second area, and delete the temporary file in the first area in response to releasing the second image from the hidden attribute.

According to various embodiments, the temporary file may include metadata related to at least one of the first image and the second image. According to various embodiments, the metadata may include at least one of path information about the first image in the first area, path information about the second image to which the hidden attribute is applied, editing information about the second image, and path information about the first image in the second area.

According to various embodiments, the at least some frames used to generate the temporary file may include a frame included in the first image or a frame included in the second image.

According to various embodiments, the at least some frames used to generate the temporary file may include a specified frame irrelevant to the first image and the second image.

According to various embodiments, the at least one processor may perform control to display the temporary file.

According to various embodiments, the first area may be configured to be accessible by a user, and may be allocated a first logical address. According to various embodiments, the second area may be configured to be inaccessible by the user, and may be allocated a second logical address.

According to various embodiments, the at least one processor may be configured to restore the first image, based on at least one of path information about the first image in the first area and path information about the first image in the second area, which are included in the temporary file.

According to various embodiments, the at least one processor may be configured to restore the second image, based on at least one of path information about the second image to which the hidden attribute is applied and editing information about the second image, which are included in the temporary file.

According to various embodiments, the at least one processor may be configured to determine whether first information about the first image included in the temporary file matches second information about the first image included in the second image based on an image editing application being abnormally terminated before the first image is located in the second area.

According to various embodiments, the at least one processor may perform control to locate the first image in the second area by changing the logical address of the first image, based on determining that the first information matches the second information.

According to various embodiments, the at least one processor may perform to identify the first image in view of the first information and the second information, based on determining that the first information does not match the second information, and locate the first image in the second area by changing the logical address of the first image.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a memory configured to include a first area and a second area having different logical addresses; and at least one processor comprising processing circuitry and connected to the memory, wherein the memory stores instructions that, when executed by the at least one processor individually and/or collectively, controls the electronic device to:

generate a second image by editing a first image stored in the first area, store the second image as a file hidden in the first area that prevents the file from being recognized or displayed by a multimedia file management application by applying an attribute to hide the second image, generate and store in the memory a temporary file comprising metadata and at least some frames of the first image or second image, the temporary file being configured to enable restoration of the first image or the second image, change a logical address of the first image to locate the first image in the second area, restore and expose the hidden second image by (i) determining, based on the temporary file, that the first image is located in the second area, and (ii) removing the attribute, wherein expose includes making the second image visible in the first area and accessible to the multimedia file management application, and delete the temporary file stored in the memory in response to restoring and exposing the second image.

2. The electronic device of claim 1, wherein the metadata comprises at least one of path information of the first image in the first area, path information of the second image to which the hidden attribute is applied, editing information for the second image, and path information for the first image in the second area.

3. The electronic device of claim 1, wherein the at least some frames used to generate the temporary file include a specified frame irrelevant to the first image and the second image.

4. The electronic device of claim 1, wherein the memory stores instructions that, when executed by the at least one processor, individually and/or collectively, controls the electronic device to display the temporary file.

5. The electronic device of claim 1, wherein the first area is configured to be accessible by a user and is allocated a first logical address, and the second area is configured to be inaccessible by the user and is allocated a second logical address.

6. The electronic device of claim 1, wherein the memory stores instructions that, when executed by the at least one processor, individually and/or collectively, controls the electronic device to restore the first image, based on at least one of the path information of the first image in the first area and path information of the first image in the second area, included in the in temporary file.

7. The electronic device of claim 1, wherein the memory stores instructions that, when executed by the at least one processor, individually and/or collectively, controls the electronic device to restore the second image, based on at least one of path information of the second image to which the hidden attribute is applied and editing information for the second image, included in the temporary file.

8. The electronic device of claim 1, wherein the memory stores instructions that, when executed by the at least one processor, individually and/or collectively, controls the electronic device to determine whether first information for the first image in the temporary file matches second information for the first image in the second image based on an image editing application being abnormally terminated before changing the location of the first image from the first area to the second area.

9. The electronic device of claim 8, wherein the memory stores instructions that, when executed by the at least one processor, individually and/or collectively, controls the electronic device to change the location of the first image from the first area to the second area by changing the logical address of the first image, based on determining that the first information matches the second information.

10. The electronic device of claim 8, wherein the memory stores instructions that, when executed by the at least one processor, individually and/or collectively, controls the electronic device to: identify the first image in view of the first information and the second information, based on determining that the first information does not match the second information, and change the location of the first image from the first area to the second area by changing the logical address of the first image.

11. A method of operating an electronic device, the method comprising:

generating a second image by editing a first image stored in a first area, storing the second image as a file hidden in the first area that prevents the file from being recognized or displayed by a multimedia file management application by applying an attribute to hide the second image, generating and storing in memory a temporary file comprising metadata and at least some frames of the first image or second image, the temporary file being configured to enable restoration of the first image or the second image, changing a logical address of the first image to locate the first image in a second area, restoring and exposing the hidden second image by (i) determining, based on the temporary file, that the first image is located in the second area, and (ii) removing the attribute, wherein expose includes making the second image visible in the first area and accessible to the multimedia file management application, and delete the temporary file stored in the memory in response to restoring and exposing the second image.

12. The method of claim 11, wherein the metadata comprises at least one of path information of the first image in the first area, path information of the second image to which the hidden attribute is applied, editing information for the second image, and path information for the first image in the second area.

13. The method of claim 11, further comprising displaying the temporary file.

14. The method of claim 11, wherein the at least some frames used to generate the temporary file include a specified frame irrelevant to the first image and the second image.

15. The method of claim 11, further comprising restoring the first image, based on at least one of the path information of the first image in the first area and path information of the first image in the second area, included in the in temporary file.

16. The method of claim 11, further comprising restoring the second image, based on at least one of path information of the second image to which the hidden attribute is applied and editing information for the second image, included in the temporary file.

*     *     *     *     *